United States Patent
Anand et al.

(10) Patent No.: US 9,438,703 B2
(45) Date of Patent: *Sep. 6, 2016

(54) METHOD OF FORMING A HASH INPUT FROM PACKET CONTENTS AND AN APPARATUS THEREOF

(71) Applicant: XPLIANT, Inc, San Jose, CA (US)

(72) Inventors: Vishal Anand, Saratoga, CA (US);
Tsahi Daniel, Palo Alto, CA (US);
Gerald Schmidt, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/309,739

(22) Filed: Jun. 19, 2014

(65) Prior Publication Data

US 2015/0373164 A1    Dec. 24, 2015

(51) Int. Cl.
*H04L 12/28* (2006.01)
*H04L 29/06* (2006.01)
*H04L 12/931* (2013.01)
*H04L 29/08* (2006.01)

(52) U.S. Cl.
CPC ........... *H04L 69/22* (2013.01); *H04L 49/00* (2013.01); *H04L 69/324* (2013.01)

(58) Field of Classification Search
CPC ...... H04L 69/22; H04L 69/324; H04L 49/00
See application file for complete search history.

(56) References Cited

U.S. PATENT DOCUMENTS

| | | | |
|---|---|---|---|
| 5,805,808 A | 9/1998 | Hasani et al. | |
| 6,088,356 A | 7/2000 | Hendel et al. | |
| 6,341,129 B1 | 1/2002 | Schroeder et al. | |
| 6,789,116 B1 | 9/2004 | Sarkissian et al. | |
| 7,187,694 B1 | 3/2007 | Liao | |
| 7,359,403 B1 | 4/2008 | Rinne | |
| 7,568,047 B1 | 7/2009 | Aysan et al. | |
| 7,606,263 B1 | 10/2009 | Parker | |
| 7,822,032 B1 | 10/2010 | Parker et al. | |
| 7,903,689 B2 | 3/2011 | Niinomi et al. | |
| 8,144,706 B1 | 3/2012 | Daniel et al. | |
| 8,705,533 B1 | 4/2014 | Venkatraman | |
| 2001/0050914 A1 | 12/2001 | Akahane et al. | |
| 2002/0016852 A1 | 2/2002 | Nishihara | |
| 2002/0083210 A1 | 6/2002 | Harrison et al. | |
| 2002/0163935 A1 | 11/2002 | Paatela et al. | |
| 2002/0191521 A1 | 12/2002 | Minamino et al. | |
| 2003/0152078 A1 | 8/2003 | Henderson et al. | |
| 2003/0193949 A1 | 10/2003 | Kojima et al. | |
| 2003/0210702 A1 | 11/2003 | Kendall | |
| 2003/0231625 A1 | 12/2003 | Calvignac et al. | |
| 2005/0213570 A1 | 9/2005 | Stacy et al. | |

(Continued)

*Primary Examiner* — Clemence Han
(74) *Attorney, Agent, or Firm* — Haverstock & Owens LLP

(57) ABSTRACT

Embodiments of the apparatus for forming a hash input from packet contents relate to a programmable flexible solution to form hash inputs, allowing for hardware changes and for adding support for newer protocols as and when they are defined in the future. A packet is split into individual layers. Each layer is given a unique layer type number that helps identify what that layer is. Based on the layer type, each layer is expanded to a generic format. Each layer has a set of hash commands that is generic to that layer. Fields of each hash command are fieldOffset, fieldLen, hashMask, and hashMaskMSB. These hash commands allow information in the packet to be extracted in a programmable manner. The fields extracted from each protocol layer of the packet are concatenated to form a hash layer. A bit vector indicates which hash layers are used to form the hash input.

38 Claims, 8 Drawing Sheets

(56) References Cited

U.S. PATENT DOCUMENTS

| | | | |
|---|---|---|---|
| 2005/0232303 A1 | 10/2005 | Deforche et al. | |
| 2005/0276230 A1 | 12/2005 | Akahane et al. | |
| 2005/0281281 A1 | 12/2005 | Nair et al. | |
| 2006/0039372 A1 | 2/2006 | Sarkinen et al. | |
| 2006/0168309 A1 | 7/2006 | Sikdar et al. | |
| 2006/0280178 A1 | 12/2006 | Miller et al. | |
| 2007/0078997 A1 | 4/2007 | Stern | |
| 2008/0008159 A1* | 1/2008 | Bourlas | H04L 69/32 370/352 |
| 2009/0067325 A1 | 3/2009 | Baratakke et al. | |
| 2009/0234818 A1 | 9/2009 | Lobo et al. | |
| 2009/0238190 A1* | 9/2009 | Cadigan, Jr. | H04L 12/462 370/395.53 |
| 2010/0161787 A1 | 6/2010 | Jones | |
| 2010/0272125 A1* | 10/2010 | Franke | H04L 69/12 370/476 |
| 2010/0329255 A1 | 12/2010 | Singhal | |
| 2011/0022732 A1 | 1/2011 | Hutchison et al. | |
| 2011/0058514 A1* | 3/2011 | Lee | H04B 7/2606 370/315 |
| 2011/0134920 A1* | 6/2011 | Dyke | H04L 45/60 370/392 |
| 2011/0142070 A1 | 6/2011 | Lim et al. | |
| 2011/0261812 A1* | 10/2011 | Kini | H04L 12/4633 370/389 |
| 2011/0268123 A1 | 11/2011 | Kopelman et al. | |
| 2011/0310892 A1 | 12/2011 | DiMambro | |
| 2012/0281714 A1 | 11/2012 | Chang et al. | |
| 2013/0039278 A1* | 2/2013 | Bouazizi | H04L 65/4076 370/328 |
| 2013/0163427 A1 | 6/2013 | Beliveau et al. | |
| 2013/0163475 A1 | 6/2013 | Beliveau et al. | |
| 2013/0215906 A1 | 8/2013 | Hidai | |
| 2013/0238792 A1 | 9/2013 | Kind et al. | |
| 2014/0119231 A1* | 5/2014 | Chan | H04L 47/115 370/253 |
| 2014/0269307 A1 | 9/2014 | Banerjee et al. | |
| 2014/0328354 A1* | 11/2014 | Michael | H04N 21/643 370/474 |
| 2014/0369365 A1* | 12/2014 | Denio | H04L 69/16 370/474 |
| 2015/0081726 A1* | 3/2015 | Izenberg | G06F 17/30943 707/755 |
| 2015/0189047 A1* | 7/2015 | Naaman | G06F 17/30943 370/474 |
| 2015/0222533 A1* | 8/2015 | Birrittella | H04L 45/66 370/392 |

\* cited by examiner

Format of a double tagged Ethernet header

| SA (6 Bytes) | DA (6 Bytes) | Service VLAN Tag (4Bytes) | Customer VLAN Tag (4Bytes) | ETHERTYPE (2Bytes) |

Fig. 2A

Bit Vector

| 1 | 1 | 1 | 1 | 1 | 1 | | | | | | | 1 | 1 | 1 | 1 | | | | | 1 | 1 |
| | | | | | | 1 | 1 | 1 | 1 | 1 | 1 | | | | | 1 | 1 | 1 | 1 | | |

Byte Numbering

| 0 | 1 | 2 | 3 | 4 | 5 | 6 | 7 | 8 | 9 | 10 | 11 | 12 | 13 | 14 | 15 | 16 | 17 | 18 | 19 | 20 | 21 |

Fig. 2B

Format of a single tagged Ethernet header

| SA (6 Bytes) | DA (6 Bytes) | Customer VLAN Tag (4Bytes) | ETHERTYPE (2Bytes) |
|---|---|---|---|

Fig. 3A

Format of the single tagged Ethernet header in generic format

| SA (6 Bytes) | DA (6 Bytes) | Service VLAN Tag (4Bytes) Marked Invalid | Customer VLAN Tag (4Bytes) | ETHERTYPE (2Bytes) |
|---|---|---|---|---|

Fig. 3B

Bit Vector

| 1 | 1 | 1 | 1 | 1 | 1 | | | | | | | 0 | 0 | 0 | 0 | | | | | 1 | 1 |
|---|---|---|---|---|---|---|---|---|---|---|---|---|---|---|---|---|---|---|---|---|---|
| | | | | | | 1 | 1 | 1 | 1 | 1 | 1 | | | | | 1 | 1 | 1 | 1 | | |

Byte Numbering

| 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|

Fig. 3C

Format of an untagged Ethernet header

| SA (6 Bytes) | DA (6 Bytes) | ETHERTYPE (2Bytes) |
|---|---|---|

Fig. 4A

Format of the untagged Ethernet header in generic format

| SA (6 Bytes) | DA (6 Bytes) | Service VLAN Tag (4Bytes) Marked Invalid | Customer VLAN Tag (4Bytes) Marked Invalid | ETHERTYPE (2Bytes) |
|---|---|---|---|---|

Fig. 4B

Bit Vector

| 1 | 1 | 1 | 1 | 1 | 1 | | | | | | | 0 | 0 | 0 | 0 | | | | | 1 | 1 |
|---|---|---|---|---|---|---|---|---|---|---|---|---|---|---|---|---|---|---|---|---|---|
| | | | | | | 1 | 1 | 1 | 1 | 1 | 1 | | | | | 0 | 0 | 0 | 0 | | |

Byte Numbering

| 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|

Fig. 4C

METHOD OF FORMING A HASH INPUT FROM PACKET CONTENTS AND AN APPARATUS THEREOF

FIELD OF INVENTION

The present invention relates to network packets. More particularly, the present invention relates to a method of forming a hash input from packet contents and an apparatus thereof.

BACKGROUND OF THE INVENTION

In Ethernet switches, it is often required to form a unique signature for each incoming packet received at a switch. This unique signature can be used in equal-cost multi-path routing (ECMP), where packets from the same source can be sent along multiple different destination paths. In order to form this unique signature, current hardware-based implementations define which fixed fields in the packets should be used as hash inputs.

BRIEF SUMMARY OF THE INVENTION

Embodiments of the apparatus for forming a hash input from packet contents relate to a programmable flexible solution to form hash inputs. This solution allows for hardware changes based on different requirement and for adding support for newer protocols as and when they are defined in the future. A packet is split into individual layers. Each layer is given a unique layer type number that helps identify what that layer is. Based on the layer type, each layer is expanded to a generic format. Each layer has a set of hash commands that is generic to that layer. Fields of each hash command are fieldOffset, fieldLen, hashMask, and hashMaskMSB. These hash commands allow information in the packet to be extracted in a programmable manner. The fields extracted from each protocol layer of the packet are concatenated to form a hash layer. A bit vector indicates which hash layers are used to form the hash input.

In one aspect, a method of implementing a parser engine is provided. The method includes the method includes identifying protocol layers of a packet, expanding each of the protocol layers to a generic format based on the identification of that protocol layer, and selecting contents from the expanded protocol layers.

In some embodiments, each of the protocol layers of the packet is identified based on a unique layer type number of the protocol layer.

In some embodiments, the generic format defines a superset of all fields that the protocol layer can have.

In some embodiments, expanding each of the protocol layers includes maintaining a bit vector for an expanded protocol layer, wherein the bit vector includes a bit per byte for each byte of the expanded protocol layer, marking a bit as available for each byte of each valid field, wherein each valid field is a field existing in the protocol layer of the packet, and marking a bit as unavailable for each byte of each invalid field, wherein each invalid field is a field that did not exist in the protocol layer of the packet.

In some embodiments, the method also includes using a compressed format to express the expanded protocol layer.

In some embodiments, the method also includes applying at least one from a set of generic hash commands to the expanded protocol layer to extract a field from the expanded protocol layer. Fields of each of the generic hash commands are fieldOffset, which specifies offset within the expanded layer where a field to be extracted starts, fieldLen, which specifies a number of bytes that should be extract from that specified offset, hashMask, which is a bit mask, and hashMaskMSB, which indicates whether the bit mask is to be applied to the most significant byte or the least significant byte of the extracted field. In some embodiments, the fields of each of the generic layer commands are software defined.

In some embodiments, the method also includes applying a logical AND operation on a bit mask and one byte of the extracted field, wherein the bit mask is specified by the at least one hash command, forming a hash input layer based on at least the result of the logical AND operation, and retrieving a bit vector that indicates which hash input layers of the expanded protocol layers are to be used to form a hash input to the hash function. In some embodiments, the method also includes using the hash input as an input to the hash function.

In another aspect, a method of implementing a network switch is provided. The method includes receiving a packet at an incoming port of the network switch, generalizing each protocol header of the packet according to a generic format for a corresponding protocol, for each generalized protocol header, extracting one or more fields from the generalized protocol header, for each generalized protocol header, concatenating the one or more fields from the generalized protocol header to form a hash layer, and using a bit vector to determine which hash layers of all expanded protocol headers are to be selected to form a hash input.

In some embodiments, the network switch includes a parser engine configured to generalize each protocol header, to extract one or more fields from the generalized protocol header, to concatenate the one or more extracted fields from the generalized protocol header to form a hash layer, and to use a bit vector to determine which hash layers of all expanded protocol headers are to be selected to form a hash input.

In some embodiments, generalizing each protocol header includes the parser engine determining a layer type of the protocol header and a variant of the layer type, the parser engine detecting missing fields from the protocol based on the layer type and the variant, and based on the detection, the parser engine expands the protocol header to the generic format.

In some embodiments, extracting one or more fields includes applying one or more generic hash commands to the generalized protocol header. Fields of each of the generic hash commands are fieldOffset, which specifies offset within the expanded layer where a field to be extracted starts, fieldLen, which specifies a number of bytes that should be extract from that specified offset, hashMask, which is a bit mask, and hashMaskMSB, which indicates whether the bit mask is to be applied to the most significant byte or the least significant byte of the extracted field.

In some embodiments, after extracting one or more fields and prior to concatenating the one or more extracted fields, the method includes applying a logical AND operation on a bit mask and one byte of an extracted field, wherein the bit mask is specified by a generic hash command.

In some embodiments, prior to using a bit vector, the method includes indexing a local table using a PktID of the packet, wherein the table stores bit vectors for each known protocol layer combination.

In some embodiments, prior to receiving a packet, the method includes programming fields of each of the one or more generic hash commands via software.

In some embodiments, prior to receiving a packet, the method includes allowing for software-defined mappings of generic formats of protocols and storing the software-defined mappings in the memory of the network switch.

In yet another aspect, a network switch is provided. The network switch includes an input port and an output port for receiving and transmitting packets. The network switch also includes a memory for storing a set of software-defined mappings of generic formats of protocols, for storing sets of generic hash commands for extracting fields, and for storing a table of bit vectors. The network switch also includes a parser engine for performing a header generalization process on the packet to generalize each protocol header of a packet according to one of the software-defined mappings that is specific to a corresponding protocol, and for selecting contents from the generalized protocol headers to apply to a hash function. The header generalization process can be used on different variants of a protocol, on different protocols, or both.

In some embodiments, after the packet is processed by the parser engine, the packet includes canonicalized protocol layers. Each of the canonicalized protocol layers is a protocol layer expanded according to corresponding generic format for the corresponding protocol.

In some embodiments, the parser engine further applies at least one hash command from one of the sets of generic hash commands to each of the generalized protocol layers to extract a field from the generalized protocol layer. In some embodiments, the one of the set of generic hash commands is specific to the corresponding protocol. In some embodiments, fields of each of the generic hash commands are software defined.

In some embodiments, the at least one hash command specifies a bit mask and a byte location of the extracted field to apply the bit mask to. In some embodiments, the parser engine further applies a logical AND operation on the bit mask and the byte location of the extracted field. In some embodiments, the result from the logical AND operation is concatenated with other results from other AND operations to form a hash input layer. In some embodiments, the parser engine accesses the local table to retrieve therefrom a bit vector to apply to hash input layers to form a hash input for the hash function.

In yet another aspect, a parser engine is provided. The parser engine includes a circuit configured to identify protocol layers of a packet, expand each of the protocol layers to a generic format based on the identification of that protocol layer, and select contents from the expanded protocol layers to apply to a hash function.

In some embodiments, each of the protocol layers of the packet is identified based on a unique layer type number. In some embodiments, the generic format defines a super-set of all fields that the protocol layer can have.

In some embodiments, the circuit is also configured to apply at least one from a set of generic hash commands to the expanded protocol layer extract a field from the expanded protocol layer. In some embodiments, fields of each of the generic hash commands are fieldOffset, which specifies offset within the expanded layer where a field to be extracted starts, fieldLen, which specifies a number of bytes that should be extract from that specified offset, hashMask, which is a bit mask, and hashMaskMSB, which indicates whether the bit mask is to be applied to the most significant byte or the least significant byte of the extracted field. In some embodiments, the fields of each of the generic hash commands are software defined.

In some embodiments, the circuit is also configured to apply a logical AND operation on a bit mask and one byte of the extracted field, wherein the bit mask is specified by the at least one hash command, form a hash input layer based on at least the result of the logical AND operation, and retrieve a bit vector that indicates which hash input layers of the expanded protocol layers are to be used to form a hash input to the hash function.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A-2B illustrate an exemplary generalization of a protocol header in accordance with some embodiments of the present invention.

FIGS. 3A-3C illustrate another exemplary generalization of a protocol header in accordance with some embodiments of the present invention.

FIGS. 4A-4C illustrate another exemplary generalization of a protocol header in accordance with some embodiments of the present invention.

DETAILED DESCRIPTION OF THE INVENTION

Figure 1:
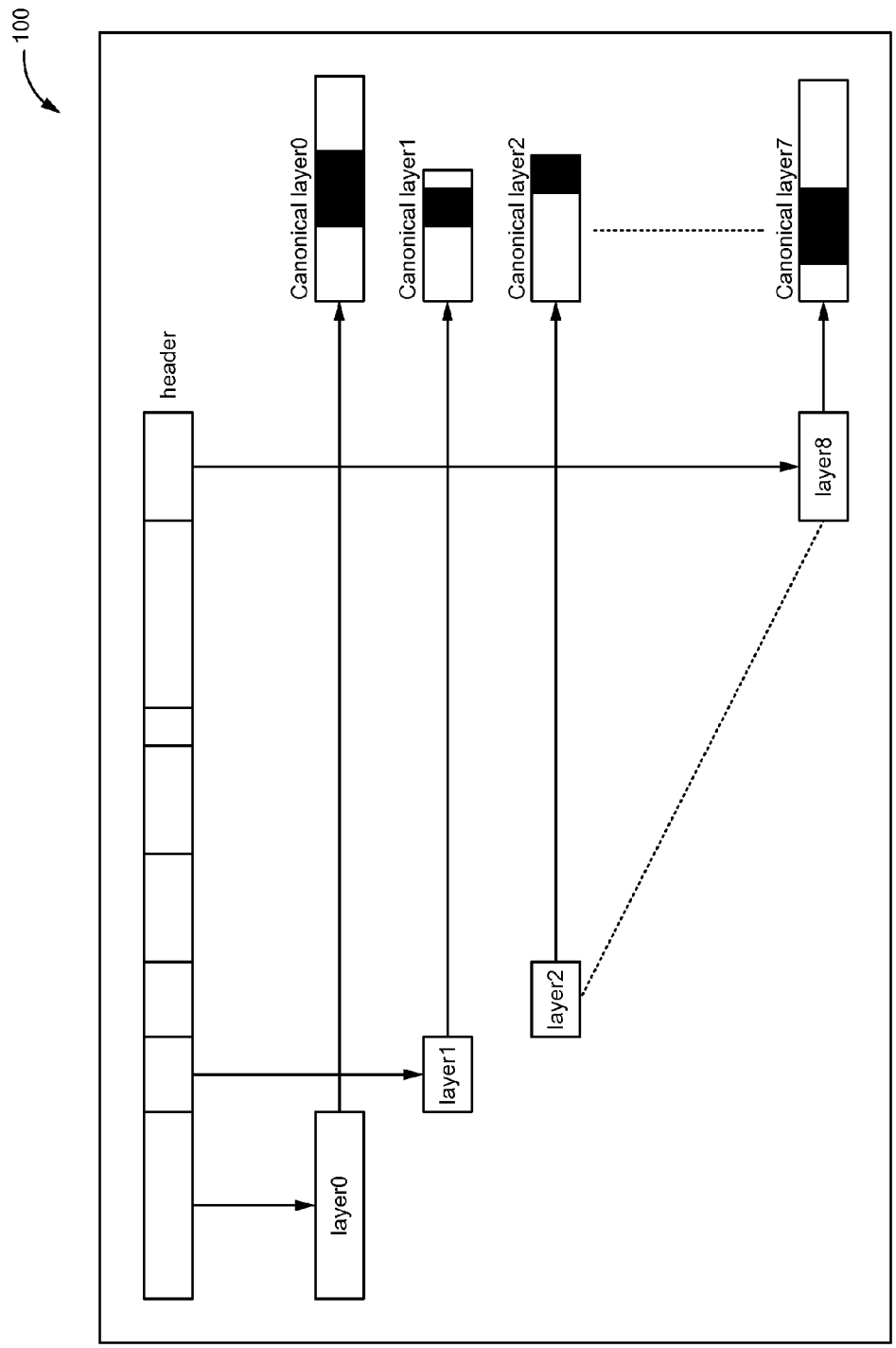
FIG. 1 illustrates diagram of header expansion of layers of an incoming packet to generic formats in accordance with some embodiments of the present invention.

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the apparatus for forming a hash input from packet contents relate to a programmable flexible solution to form hash inputs. This solution allows for hardware changes based on different requirement and for adding support for newer protocols as and when they are defined in the future. A packet is split into individual layers. Each layer is given a unique layer type number that helps identify what that layer is. Based on the layer type, each layer is expanded to a generic format. Each layer has a set of hash commands that is generic to that layer. Fields of each hash command are fieldOffset, fieldLen, hashMask, and hashMaskMSB. These hash commands allow information in the packet to be extracted in a programmable manner. The fields extracted from each protocol layer of the packet are concatenated to form a hash layer. A bit vector indicates which hash layers are used to form the hash input.

A network device, such as a network switch, is able to switch/route network traffic. The network switch includes at least one input/incoming port and at least one output/outgoing port for receiving and transmitting packets. In some embodiments, the network switch also includes a parser and a rewriter. The parser can include one or more parser engines to identify contents of network packets, and the rewriter can include one or more rewrite engines to modify packets before they are transmitted out from the network switch. The parser engine(s) and the rewrite engine(s) are flexible and operate on a programmable basis.

The network switch also includes memory to store data used by the network switch. For example, the memory stores a set of generic hash commands. Briefly, the hash commands are typically used to extract fields from protocol headers for forming hash inputs. For another example, the memory also stores software-defined mappings of generic formats of protocols. Briefly, each protocol header is represented according to one of the software-defined mappings that is specific to a corresponding protocol. As it will become evident, these mappings can be used on different variants of a protocol as well as on different protocols, including new protocols. For yet another example, the memory also stores counters and statistics.

In Ethernet, packets include multiple protocol layers. Each protocol layer carries different information. Some examples of well known layers are:
Ethernet
PBB Ethernet
ARP
IPV4
IPV6
MPLS
FCOE
TCP
UDP
ICMP
IGMP
GRE
ICMPv6
VxLAN
TRILL
CNM Theoretically, the protocol layers can occur in any order. However, only some well-known combinations of these layers occur. Some examples of valid combinations of these layers are:
Ethernet
Ethernet, ARP
Ethernet, CNM
Ethernet, FCoE
Ethernet, IPV4
Ethernet, IPV4, ICMP
Ethernet, IPV4, IGMP For packet parsing (and rewrite) operations, a packet is broken into layers. This split is done based on well-known layers such as those listed above. Many of the layers have different types of combinations of fields within them. In order to effectively handle the different possible combinations, the layers are expanded into generic formats. These generic formats allow use of commands, such as hash commands, that are agnostic of the specific fields within the layers. A generic form defines a super-set of all fields that any known layer can have.

FIG. 1 illustrates diagram 100 of header expansion of layers of an incoming packet to generic formats in accordance with some embodiments of the present invention. In FIG. 1, the incoming packet includes eight header protocol layers. Each protocol layer typically includes a header for its respective protocol. More or less protocol layers are possible as indicated above. The parser engine is able to identify each layer and a variant thereof. The parser engine expands each protocol layer based on the identification and variant of the layer, as illustrated in FIG. 1. A canonical layer refers to a protocol layer that has been expanded to its generic format. Briefly, each canonical layer includes a bit vector with bits marked as 0 for invalid fields and bits marked as 1 for valid fields.

Assume the parser engine has identified a layer as being an Ethernet packet header. FIGS. 2A-4C illustrate examples of how the parser engine works on the Ethernet protocol in accordance with some embodiments of the present invention. The examples illustrated in FIGS. 2A-4C demonstrate that the parser engine is able to work on different variants of a protocol, such as the Ethernet protocol. Each example illustrates an incoming header of the Ethernet protocol and its corresponding generic format. Although other protocols are not discussed, it is noted that the parser engine works similarly on the other protocols.

FIG. 2A illustrates a format 200 of an exemplary Ethernet packet header of an incoming packet. The Ethernet packet header 200 is 22 bytes and includes five fields: a Source Address (SA) field, a Destination Address (DA) field, a Service VLAN Tag field, a Customer VLAN Tag field and an EtherType field. The SA field and the DA field are each 6 bytes. The Service VLAN Tag field and the Customer VLAN Tag field are each 4 bytes. The EtherType field is 2 bytes. The packet with the Ethernet packet header 100 is the biggest variant of an Ethernet packet and has the maximum size of 22 bytes.

The parser engine processes the Ethernet packet header 200 and determines that none of the fields are missing from the Ethernet packet header 200. A generic format of the Ethernet packet header 200 is thus the same as that of the Ethernet packet header 200 since the Ethernet packet header 200 contains all possible fields. FIG. 2B illustrates a bit vector 205 that represents the Ethernet packet header 200 of FIG. 2A. Each bit of the bit vector 205 corresponds to one of the 22 bytes of the Ethernet packet header 200. The bit vector 205 contains all 1's since all the fields of the Ethernet packet header 200 are valid or have values as the fields exist in the Ethernet packet header 200. Accordingly, the Ethernet packet header 200 is represented by the generic format of {22'b111111_111111_1111_1111_11}.

FIG. 3A illustrates a format 300 of another exemplary Ethernet packet header of an incoming packet. The Ethernet packet header 300 is 18 bytes and includes only four fields: the SA field, the DA field, the Customer VLAN Tag field and the EtherType field. The Ethernet packet header 300 is missing the Service VLAN tag field. The packet with the Ethernet packet header 300 is another variation of an Ethernet packet.

The parser engine processes the Ethernet packet header 300 and determines that the Service VLAN tag field is missing from the Ethernet packet header 300 and expands the Ethernet packet header 300 to its maximum size of 22 bytes by including the missing Service VLAN tag field at the appropriate location of a generic format of the Ethernet packet header 300. FIG. 3B illustrates the generic format 300' of the expanded Ethernet packet header. The expanded Ethernet packet header 300' includes all possible fields of the Ethernet protocol, including the missing Service VLAN tag field. The valid fields in the expanded Ethernet packet header 300' are the SA field, the DA field, the Customer VLAN Tag field and the EtherType field, as they exist in the Ethernet packet header 300. The invalid field in the expanded Ethernet packet header 300' is the Service VLAN tag field, as it did not exist in the Ethernet packet header 300 but is added in the expanded Ethernet packet header 300'.

FIG. 3C illustrates a bit vector 305 that represents the expanded Ethernet packet header 300' of FIG. 3B. Each bit of the bit vector 305 corresponds to one of the 22 bytes of the expanded Ethernet packet header 300'. The bit vector 305 contains 1's for all valid fields, which are the SA field, the DA field, the Customer VLAN Tag field and the EtherType field. The bit vector 305 contains 0's for all invalid fields, which is only the Service VLAN tag field. Accordingly, the Ethernet packet header 300 is represented by the generic format of {22'b111111_111111_0000_1111_11}.

FIG. 4A illustrates a format 400 of another exemplary Ethernet packet header of an incoming packet. The Ethernet packet header 400 is 14 bytes and includes only three fields: the SA field, the DA field and the EtherType field. The Ethernet packet header 400 is missing the Service VLAN tag field and the Customer VLAN Tag field. The packet with the Ethernet packet header 400 is the smallest variant of an Ethernet packet.

The parser engine processes the Ethernet header 400 and determines that the Service VLAN tag field and the Customer VLAN Tag field are missing from the Ethernet packet header 400 and expands the Ethernet packet header 400 to its maximum size of 22 bytes by including the missing Service VLAN tag field and the missing Customer VLAN Tag field at the appropriate locations of a generic format of the Ethernet packet header 400. FIG. 4B illustrates a generic format 400' of the expanded Ethernet packet header. The expanded Ethernet packet header 400' includes all possible fields of the Ethernet protocol, including the missing Service VLAN tag field and missing the Customer VLAN Tag field. The valid fields in the expanded Ethernet packet header 400' are the SA field, the DA field and the EtherType field, as they exist in the Ethernet packet header 400. The invalid fields in the expanded Ethernet packet header 400' are the Service VLAN tag field and the Customer VLAN Tag field, as they did not exist in the Ethernet packet header 400 but are added in the expanded Ethernet packet header 400'.

FIG. 4C illustrates a bit vector 405 that represents the expanded Ethernet packet header 400' of FIG. 4B. Each bit of the bit vector 405 corresponds to one of the 22 bytes of the expanded Ethernet packet header 400'. The bit vector 405 contains 1's for all valid fields, which are the SA field, the DA field and the EtherType field. The bit vector 405 contains 0's for all invalid fields, which are the Service VLAN tag field and the Customer VLAN Tag field. Accordingly, the Ethernet packet header 400 is represented by the generic format of {22'b111111_111111_0000_0000_11}.

As illustrated in FIGS. 2A-4C, irrespective of the variation of an incoming Ethernet header, once the expansion of the Ethernet header to the generic format is performed, field offsets are the same as the biggest sized Ethernet header (e.g., Ethernet packet header 200 of FIG. 2A). The header expansion advantageously allows for the same set of software commands to work, irrespective of the incoming Ethernet header since the Ethernet header is expanded to the biggest sized Ethernet header. As such, a hash command extracting, for example, the EtherType field will always point to the same offset irrespective of which Ethernet header was received.

In some embodiments, a compressed format is used to express which fields are present in any received header. The compact format is made of a combination of two fields, namely:

contBytes: This indicates how many bytes are valid in the beginning of the layer; and validBytes: This is a bit vector which indicates the validity of each byte in the layer.

For example, if contBytes is eight and validBytes is 4'h0111, then the a respective layer includes bytes 0-7 that are valid, followed by a null byte and three valid bytes. Use of this compressed format helps save the number of bits that are required to represent the layer. The total number of bytes can be computed by the pseudo-code shown in Table 1.

TABLE 1

```
Total_length = contBytes;
for (i = 0; i < LENGTH_OF_VALID_BYTES; i++)
    if (validBytes[i])
        Total_length++;
```

Generic formats of headers result in hardware and software flexibility in terms of extracting fields from the packet headers. Hardware is able to extract fields the packet headers irrespective of where fields reside within the packet headers. Hardware can be programmed by software to support new protocols. Software programs generic formats in a hardware table for various header protocols.

Once protocol headers are expanded, programmable hash commands allow fields from the packets to be extracted. Each layer has a set of N hash commands that is specific to the corresponding protocol. Table 2 lists fields of each hash command. These fields are software-defined.

TABLE 2

| Command Fields | Description |
| --- | --- |
| fieldOffset | Specifies offset within layer where field that needs to be extracted starts |
| fieldLen | Specifies number of bytes that should be extracted from the specified offset |
| hashMask | 8-bit mask which is AND with field contents |
| hashMaskMSB | If set to 1, then the mask should be applied to most significant byte of the extracted field. If set to 0, then the mask should be applied to the least significant byte of the extracted field. |

The generic hash commands allow the information in the packet to be extracted in a programmable manner. For example, comparing with traditional implementations, for Ethernet, to extract the MAC DA (MAC destination address), the hash command would specify an offset of 0 and a length of six bytes. This will result in the first six bytes, which carry the MAC DA, to be extracted from the layer. Similarly, to extract the IP DA, the hash command would specify an offset of 16 and a length of four bytes. This will result in the four bytes starting at the offset of 16, which carry the IP DA, to be extracted from the layer.

The generic hash commands use hashMask for bitmask operations. In particular, hashMask masks one or more bits from an extracted field. The generic hash commands can also use hashMaskMSB. If hashMaskMSB is set to 1, then hashMask is applied to the most significant byte of the extracted field. If hashMaskMSB is set to 0, then hashMask is applied to the least significant byte of the extract field.

Figure 5:
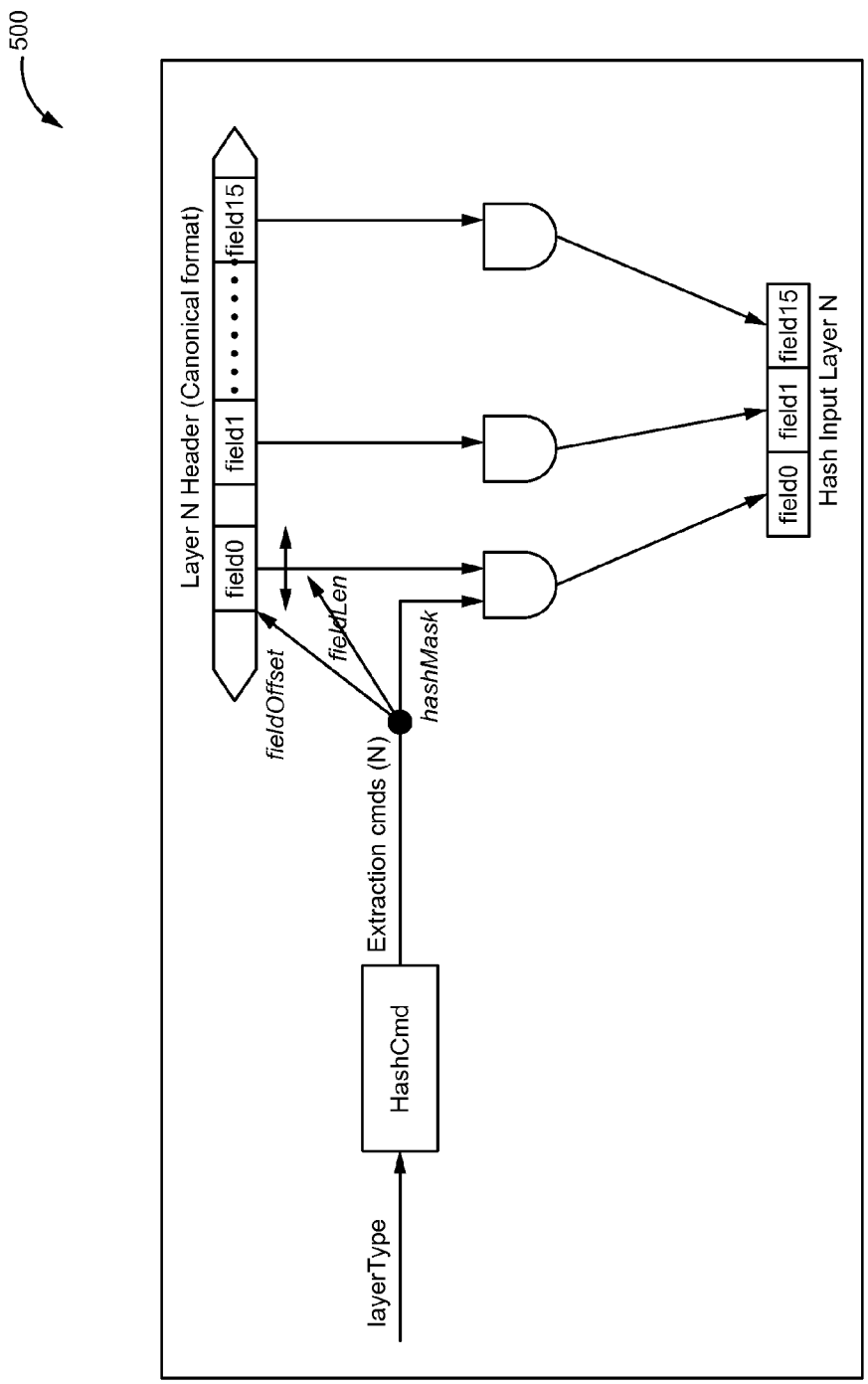
FIG. 5 illustrates a block diagram of data extraction from an expanded layer in accordance with some embodiments of the present invention.

FIG. 5 illustrates a block diagram 500 of data extraction from an expanded layer in accordance with some embodiments of the present invention. The expanded layer is labeled as "Layer N Header (Canonical Header)" in FIG. 5. The layer type, determined by the parser engine, is referenced in memory, which specifies one or more of the N hash commands for extracting fields from the expanded layer. Each hash command includes four fields: fieldOffset, fieldLen, hashMask and hashMaskMSB. In FIG. 5, a first hash command extracts field0 and performs a logical AND operation on one byte of field0 (either the most significant byte or the least significant byte of field0, as set by hashMaskMSB) and hashMask, wherein hashMaskMSB and hashMask are specified by the first hash command. A second hash command extracts field1 and performs a logical AND operation on one byte of field1 (either the most significant byte or the least significant byte of field1, as set by hashMaskMSB) and hashMask, wherein hashMaskMSB and hashMask are specified by the second hash command. And, a third hash command extracts field15 and performs a logical AND operation on one byte of field15 (either the most significant byte or the least significant byte of field15, as set by hashMaskMSB) and hashMask, wherein hashMaskMSB and hashMask are specified by the third hash command. The results from the logical AND operations are stored in a bus, shown as "Hash Input Layer N" in FIG. 5. The results are sequentially placed next to each other without any gaps between the results to form a hash input layer. In other words, the results from the logical AND operations are concatenated to form the hash input layer.

Since not all hash input layers are required for forming a hash input, an independent configuration specifies which hash input layers should be used for forming the hash input. In particular, a local table stored in the memory of the network switch is programmed to include data of each known protocol layer combination. The table, which is indexed using PktID, includes a bit vector for each protocol layer combination. The bit vector indicates which of the protocol layers of the corresponding protocol layer combination or stack should be used in the formation of a hash input.

As each packet is received at the network switch, the parser engine determines the PktID of that packet. This determination is based on the protocol layer combination or stack of that packet. After the hash input layers of the packet are formed, as described above, the local table is used to select one or more of the hash input layers based on the bit vector associated with the corresponding PktID.

For example, a bit vector having the value of 8'b00001111 indicates that only data from the hash input layers 3, 2, 1 and 0 should be used for forming the hash input. For another example, a bit vector having the value of 8'b10101010 indicates that only data from the hash input layers 7, 5, 3 and 1 should be used for forming the hash input.

The combination of the hash commands and the bit vectors allows hash inputs to be formed in a highly flexible manner. A hash output is a unique signature that identifies which of equal-cost multi-path routes a packet should take.

Figure 6A:
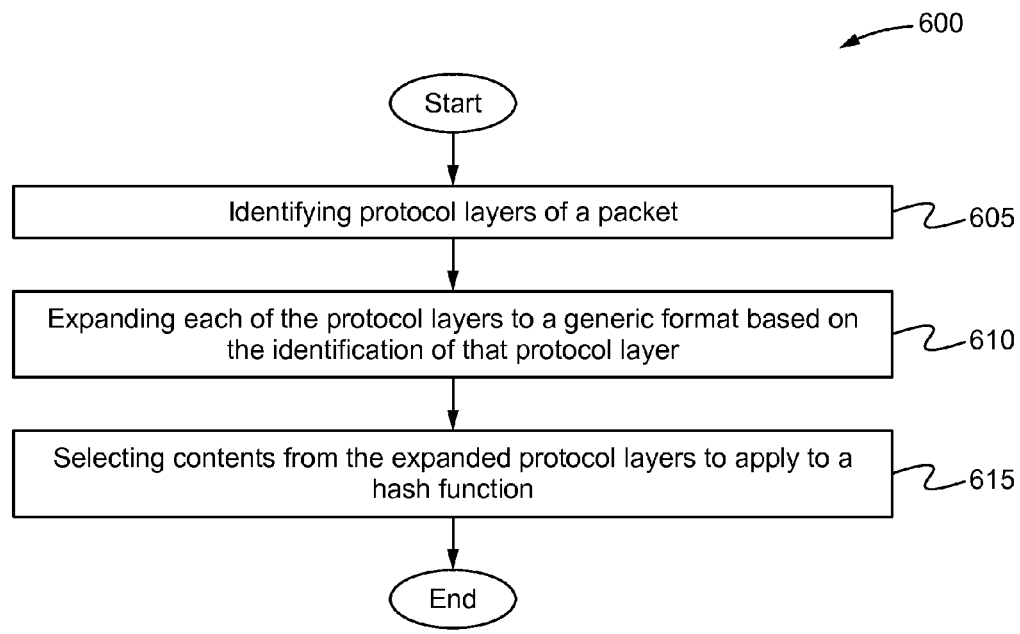
FIGS. 6A-6B illustrate methods of a parser engine in accordance with some embodiments of the present invention.

FIG. 6A illustrates a method 600 of the parser engine in accordance with some embodiments of the present invention. The parser engine is part of the network switch and identifies contents of network packets. Typically, the parser engine first splits the packet by protocol layer. At a step 605, protocol layers of a packet are identified. Each of the protocol layers of the packet is identified based on a unique layer type number of the protocol layer.

At a step 610, each of the protocol layers is expanded to a generic format based on the identification of that protocol layer. The generic format defines a super-set of all fields that the protocol layer can have. A bit vector is maintained for the expanded protocol layer. The bit vector includes a bit per byte for each byte of the expanded protocol layer. A bit is marked as available for each byte of each valid field, wherein each valid field is a field existing in the protocol layer of the packet. A bit is marked as unavailable for each byte of each invalid field, wherein each invalid field is a field that did not exist in the protocol layer of the packet. In some embodiments, a compressed format is used to express the expanded protocol layer.

At a step 615, contents from the expanded protocol layers are selected to apply to a hash function.

Figure 6B:
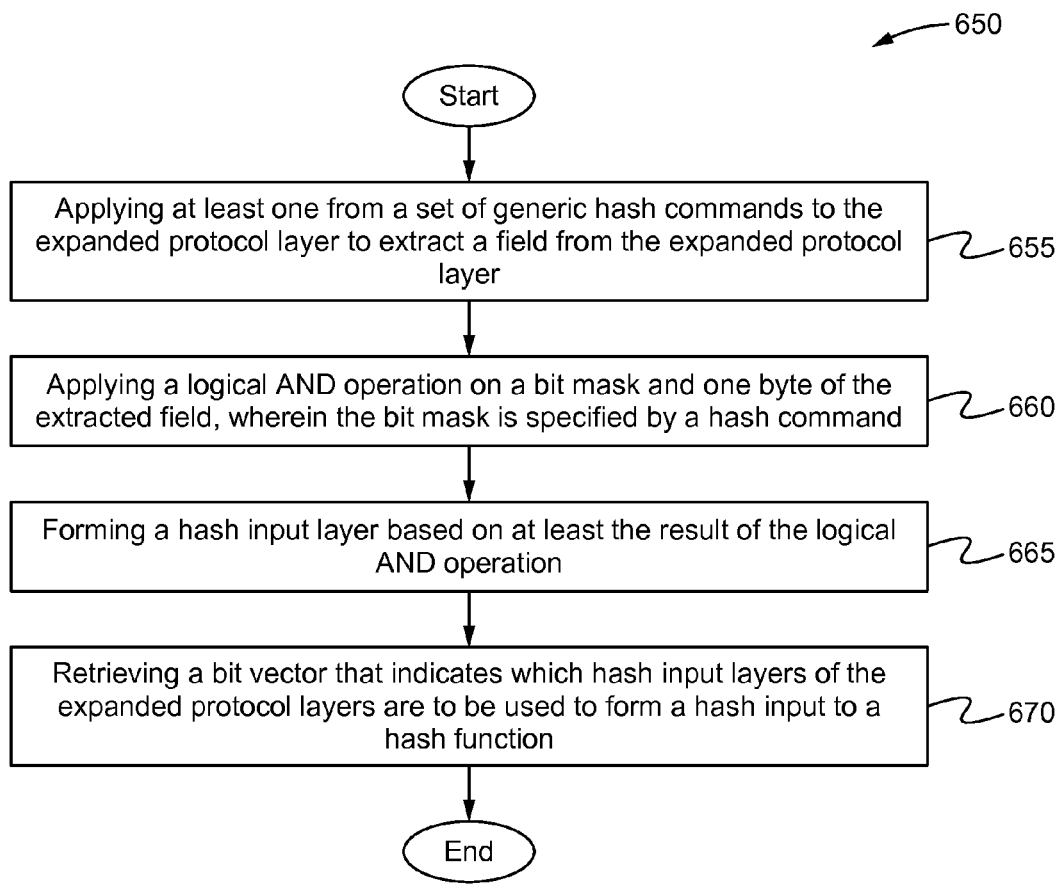

FIG. 6B illustrates another method 650 of the parser engine in accordance with some embodiments of the present invention. Typically, the parser engine performs the method 650 after the method 600. At a step 655, at least one from a set of generic hash commands is applied to the expanded protocol layer to extract a field from the expanded protocol layer. Fields of each of the generic hash commands are fieldOffset, which specifies offset within the expanded layer where a field to be extracted starts, fieldLen, which specifies a number of bytes that should be extract from that specified offset, hashMask, which is a bit mask, and hashMaskMSB, which indicates whether the bit mask is to be applied to the most significant byte or the least significant byte of the extracted field. The fields of each of the generic layer commands are software defined.

At a step 660, a logical AND operation is applied on a bit mask and one byte of the extracted field. The bit mask can be applied to either the most significant byte or the least significant byte of the extracted field. The bit mask is specified by the at least one hash command.

At a step 665, a hash input layer is formed based on at least the result of the logical AND operation.

At a step 670, a bit vector is retrieved. The bit vector is retrieved from the local table. The bit vector indicates which hash input layers of the expanded protocol layers are to be used to form a hash input to the hash function. The hash input is thereafter used as an input to the hash function. An output of the hash function is a unique signature that identifies which of the ECMP routes the packet should take.

Figure 7:
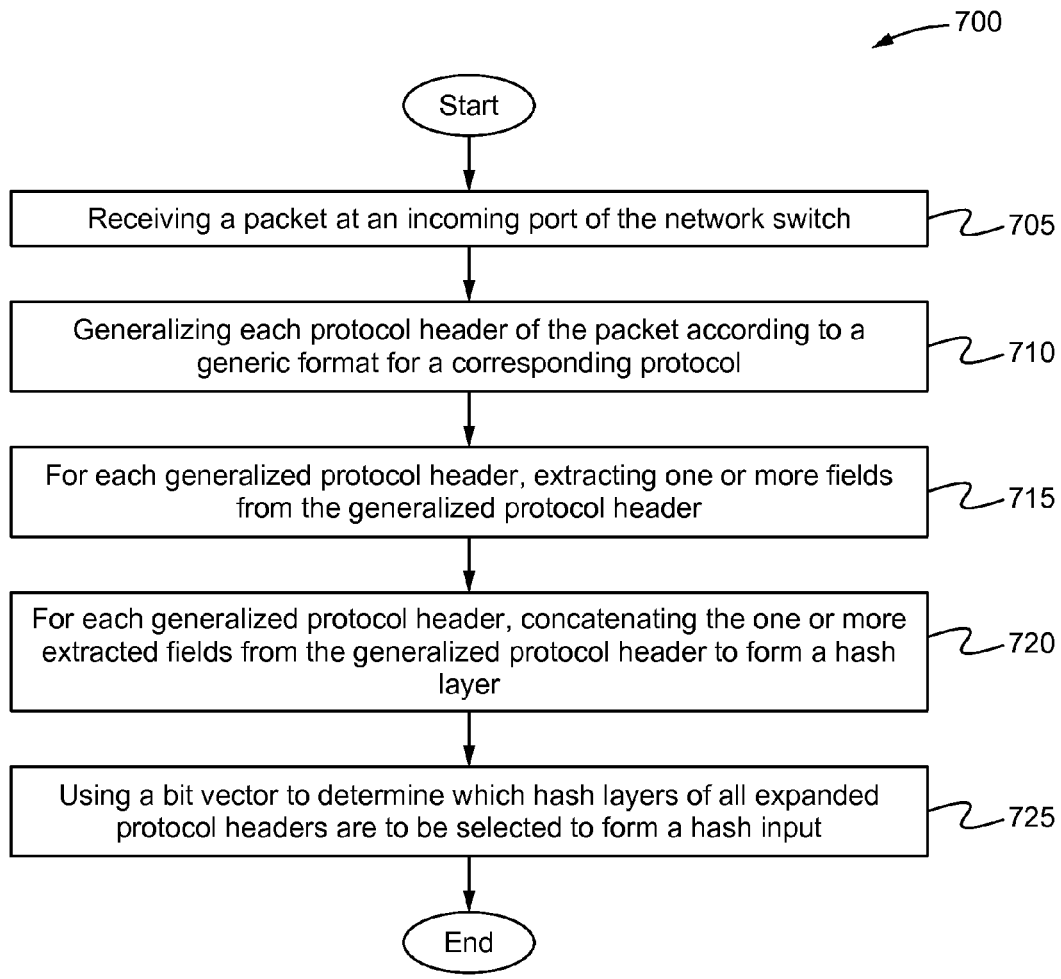
FIG. 7 illustrates a method of a network switch in accordance with some embodiments of the present invention.

FIG. 7 illustrates a method 700 of the network switch in accordance with some embodiments of the present invention. In some embodiments, the network switch allows for software-defined mappings of generic formats of protocols and stores the software-defined mappings in the memory of the network switch. At a step 705, a packet is received at an incoming port of the network switch.

At a step 710, each protocol header of the packet is generalized according to a generic format for a corresponding protocol. The parser engine determines a layer type of the protocol header and a variant of the layer type. The parser engine detects missing fields from the protocol based on the layer type and the variant. Based on the detection, the parser engine expands the protocol header to the generic format.

At a step 715, for each generalized protocol header, one or more fields from the generalized protocol header are extracted. To extract the fields, one or more generic hash commands are applied to the generalized protocol header. Fields of each of the generic hash commands are fieldOffset, which specifies offset within the expanded layer where a field to be extracted starts, fieldLen, which specifies a number of bytes that should be extract from that specified offset, hashMask, which is a bit mask, and hashMaskMSB, which indicates whether the bit mask is to be applied to the most significant byte or the least significant byte of the extracted field.

At a step 720, for each generalized protocol header, the one or more extracted fields from the generalized protocol header are concatenated to form a hash layer. In some embodiments, after the step 715 and prior to the step 720, a logical AND operation is applied on a bit mask and one byte of an extracted field. The bit mask is specified by a generic hash command.

At a step 725, a bit vector is used to determine which hash layers of all expanded protocol headers are to be selected to form a hash input. In some embodiments, prior to the step 725, a local table is indexed using a PktID of the packet. The table stores bit vectors for each known protocol layer combination. The hash input is used as an input to a hash function. An output of the hash function is a unique signature that identifies which of the ECMP routes the packet should take.

Data from a packet is extracted using hash commands. Each layer of the layer is expanded to a generic format. Generic formats of headers result in hardware and software flexibility in terms of extracting fields from the packet headers since the hash commands are agnostic of the specific fields within the layers of the packet. Determination of where relevant information to be extracted lies within the packet no longer needs to be made at implementation time.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A method of implementing a parser engine, the method comprising:
   identifying one or more protocol layers of a packet, wherein each of the protocol layers have one or more fields;
   for each protocol layer of the protocol layers, expanding the protocol layer to a generic format based on the identification of the protocol layer thereby forming an expanded protocol layer;
   selecting one or more of a set of generic hash commands based on a layer type of the expanded protocol layer; and
   selecting contents from each of the expanded protocol layers to apply a hash function by applying the one or more of the set of generic hash commands to the expanded protocol layer.

2. The method of claim 1, wherein each of the protocol layers has a unique layer type number and is identified based on the unique layer type number.

3. The method of claim 1, wherein the generic format defines a super-set of all fields that the protocol layers can have.

4. The method of claim 1, wherein the selecting contents from each of the expanded protocol layers comprises applying at least one from the one or more of the set of generic hash commands to the expanded protocol layer to extract a field from the expanded protocol layer.

5. The method of claim 4, wherein fields of each of the generic hash commands are fieldOffset, which specifies offset within the expanded protocol layer where a field to be extracted starts, fieldLen, which specifies a number of bytes that should be extract from that specified offset, hashMask, which is a bit mask, and hashMaskMSB, which indicates whether the bit mask is to be applied to the most significant byte or the least significant byte of the extracted field.

6. The method of claim 4, wherein fields of each of the generic hash commands are software defined.

7. The method of claim 4, further comprising:
   applying a logical AND operation on a bit mask and one byte of the extracted field, wherein the bit mask is specified by the at least one hash command;
   forming a hash input layer based on at least the result of the logical AND operation; and
   retrieving a bit vector that indicates which hash input layers of the expanded protocol layers are to be used to form a hash input to the hash function.

8. The method of claim 7, further comprising using the hash input as an input to the hash function.

9. A method of implementing a parser engine, the method comprising:
   identifying one or more protocol layers of a packet, wherein each of the protocol layers have one or more fields;
   for each protocol layer of the protocol layers, expanding the protocol layer to a generic format based on the identification of the protocol layer thereby forming an expanded protocol layer; and
   selecting contents from each of the expanded protocol layers to apply a hash function, wherein the expanding of the protocol layer comprises:
   maintaining a bit vector for the expanded protocol layer, wherein the bit vector includes a bit for each byte of the expanded protocol layer such that each of the bits corresponds to one of the bytes of the expanded protocol layer;
   for each of the bits, setting the bit to a first value if the corresponding byte is a part of a valid field of the protocol layer, wherein each of the valid fields is a field existing in the protocol layer of the packet before the protocol layer has been expanded to the expanded protocol layer; and
   for each of the bits, setting the bit to a second value if the corresponding byte is a part of an invalid field of the protocol layer, wherein each of the invalid fields is a field that did not exist in the protocol layer of the packet before the protocol layer has been expanded to the expanded protocol layer.

10. The method of claim 9, further comprising using a compressed format to express the expanded protocol layer.

11. A method of implementing network switch, the method comprising:
    receiving a packet having a packet header at an incoming port of the network switch, wherein the packet header includes one or more protocol headers;
    for each of the protocol headers, generalizing the protocol header to a generic format for a corresponding protocol thereby forming a generalized protocol header;
    for each generalized protocol header, extracting one or more fields from the generalized protocol header;
    for each generalized protocol header, concatenating the one or more extracted fields from the generalized protocol header to form a hash layer; and
    using a bit vector to determine which hash layers of all expanded protocol headers are to be selected to form a hash input.

12. The method of claim 11, wherein the network switch includes a parser engine configured to generalize each protocol header, to extract one or more fields from the generalized protocol header, to concatenate the one or more extracted fields from the generalized protocol header to form the hash layer, and to use the bit vector to determine which hash layers of all expanded protocol headers are to be selected to form the hash input.

13. The method of claim 12, wherein the generalizing of the protocol header comprises:
the parser engine determining a layer type of the protocol header and a variant of the layer type;
the parser engine detecting missing fields from the protocol header based on the layer type and the variant; and
based on the detection, the parser engine expanding the protocol header to the generic format.

14. The method of claim 12, wherein extracting one or more fields comprises applying one or more generic hash commands to the generalized protocol header.

15. The method of claim 14, wherein fields of each of the generic hash commands are fieldOffset, which specifies offset within the generalized protocol header where a field to be extracted starts, fieldLen, which specifies a number of bytes that should be extract from that specified offset, hashMask, which is a bit mask, and hashMaskMSB, which indicates whether the bit mask is to be applied to the most significant byte or the least significant byte of the extracted field.

16. The method of claim 14, further comprising, prior to receiving the packet, programming fields of each of the one or more generic hash commands via software.

17. The method of claim 11, further comprising, prior to receiving the packet:
allowing for software-defined mappings of generic formats of protocols; and
storing the software-defined mappings in a memory of the network switch.

18. The method of claim 11, further comprising, after extracting one or more fields and before concatenating the one or more extracted fields, applying a logical AND operation on a bit mask and one byte of an extracted field, wherein the bit mask is specified by a generic hash command.

19. The method of claim 11, further comprising, before using the bit vector, indexing a local table using a packet identifier of the packet, wherein the table stores bit vectors for each known protocol layer combination.

20. A network switch comprising:
an input port and an output port for receiving and transmitting packets having headers including one or more protocol layers;
a memory for storing a set of software-defined mappings of generic protocol layer formats for one or more protocols and for storing sets of generic hash commands for extracting desired fields from the protocol layers that have been converted into one of the generic protocol layer formats, and for storing a table of bit vectors; and
a parser engine for:
performing a header generalization process on the header of each of the packets to generalize each of the protocol layers of the header of the packet according to one of the generic protocol layer formats thereby forming an expanded protocol layer:
selecting one or more of a set of generic hash commands based on a layer type of the expanded protocol layer; and
for selecting contents from the expanded protocol layers to apply to a hash function by applying the one or more of the set of generic hash commands to the expanded protocol layer.

21. The network switch of claim 20, wherein the header generalization process is used on different variants of protocol layers of one or more of the protocols.

22. The network switch of claim 20, wherein the header generalization process is used on different protocols of the protocols.

23. The network switch of claim 20, wherein after the packet is processed by the parser engine, the packet includes canonicalized protocol layers.

24. The network switch of claim 23, wherein each of the canonicalized protocol layers is one of the expanded protocol layers that was generalized based on one of the protocol layers of the header of the packet.

25. The network switch of claim 20, wherein the parser engine further applies at least one hash command from one of the sets of generic hash commands to each of the expanded protocol layers to extract one or more fields from the expanded protocol layers.

26. The network switch of claim 25, wherein the one of the set of generic hash commands is specific to the protocol of the expanded protocol layer to which the one of the set of generic hash commands is being applied.

27. The network switch of claim 25, wherein the fields that are to be extracted by each of the generic hash commands are software defined.

28. The network switch of claim 25, wherein the at least one hash command specifies a bit mask and a byte location of the extracted field to apply the bit mask to.

29. The network switch of claim 28, wherein the parser engine further applies a logical AND operation on the bit mask and the byte location of the extracted field.

30. The network switch of claim 29, wherein the result from the logical AND operation is concatenated with other results from other AND operations to form a hash input layer.

31. The network switch of claim 30, wherein the parser engine accesses the table of bit vectors to retrieve therefrom one of the bit vectors to apply to hash input layers to form a hash input for the hash function.

32. A parser engine comprising a circuit configured to:
identify one or more protocol layers of a packet, wherein each of the protocol layers have one or more fields;
for each protocol layer of the protocol layers:
expand the protocol layer to a generic format based on the identification of the protocol layer thereby forming an expanded protocol layer;
selecting one or more of a set of generic hash commands based on a layer type of the expanded protocol layer; and
select contents from the expanded protocol layer to apply to a hash function by applying the one or more of the set of generic hash commands to the expanded protocol layer.

33. The parser engine of claim 32, wherein each of the protocol layers has a unique layer type number and is identified based on the unique layer type number.

34. The parser engine of claim 32, wherein the generic format defines a super-set of all fields that the protocol layers can have.

35. The parser engine of claim 32, wherein the circuit is also configured to apply at least one from a set of generic hash commands to the expanded protocol layer to extract one or more fields from the expanded protocol layer.

36. The parser engine of claim 35, wherein fields of each of the generic hash commands are fieldOffset, which specifies offset within the expanded protocol layer where a field to be extracted starts, fieldLen, which specifies a number of bytes that should be extract from that specified offset, hashMask, which is a bit mask, and hashMaskMSB, which indicates whether the bit mask is to be applied to the most significant byte or the least significant byte of the extracted fields.

37. The parser engine of claim 35, wherein fields of each of the generic hash commands are software defined.

38. The parser engine of claim 35, wherein the circuit is also configured to:
  apply a logical AND operation on a bit mask and one byte of the extracted field, wherein the bit mask is specified by at least one of the generic hash commands;
  form a hash input layer based on at least the result of the logical AND operation; and
  retrieve a bit vector that indicates which hash input layers of the expanded protocol layers are to be used to form a hash input to the hash function.

* * * * *